(12) United States Patent
Uemura et al.

(10) Patent No.: US 10,005,397 B2
(45) Date of Patent: Jun. 26, 2018

(54) WORK VEHICLE

(71) Applicant: KOMATSU LTD., Tokyo (JP)

(72) Inventors: Takuya Uemura, Hirakata (JP); Naoto Shigeiri, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days. days.

(21) Appl. No.: 15/536,248

(22) PCT Filed: Feb. 16, 2016

(86) PCT No.: PCT/JP2016/054468
§ 371 (c)(1),
(2) Date: Jun. 15, 2017

(87) PCT Pub. No.: WO2016/136535
PCT Pub. Date: Sep. 1, 2016

(65) Prior Publication Data
US 2017/0327046 A1 Nov. 16, 2017

(30) Foreign Application Priority Data

Feb. 23, 2015 (JP) .................. 2015-033295

(51) Int. Cl.
*B60R 3/02* (2006.01)
*E06C 5/14* (2006.01)
(Continued)

(52) U.S. Cl.
CPC ................ *B60R 3/02* (2013.01); *B60R 3/005* (2013.01); *E06C 5/14* (2013.01); *B62B 5/02* (2013.01); *E02F 9/16* (2013.01)

(58) Field of Classification Search
CPC .. B60R 3/02; B60R 3/005; E06C 5/14; B62B 5/02; E02F 9/16
See application file for complete search history.

(56) References Cited

U.S. PATENT DOCUMENTS 4,014,486 A * 3/1977 Nelson ...................... B64C 1/24
105/447
4,216,725 A * 8/1980 Hallam .................. B61D 17/20
105/348
(Continued)

FOREIGN PATENT DOCUMENTS

JP 7-10064 U 2/1995
JP 2004-143887 A 5/2004
(Continued)

OTHER PUBLICATIONS

The International Search Report for the corresponding international application No. PCT/JP2016/054468, dated Apr. 12, 2016.

*Primary Examiner* — Hau V Phan
*Assistant Examiner* — Jacob B Meyer
(74) *Attorney, Agent, or Firm* — Global IP Counselors, LLP

(57) ABSTRACT

An access device is configured to be switched between a stored state in which an access member is stored in a vehicle body and a deployed state in which the access member is deployed. In the stored state, an exterior cover becomes a portion of an exterior surface of the vehicle body and the access member is stored inside the vehicle body. In the deployed state, the access member extends from the vehicle body toward a ground surface and the exterior cover is disposed on a back side of the access member.

15 Claims, 11 Drawing Sheets

(51) Int. Cl.
  *B60R 3/00* (2006.01)
  *E02F 9/16* (2006.01)
  *B62B 5/02* (2006.01)

(56) References Cited

U.S. PATENT DOCUMENTS

| | | | | |
|---|---|---|---|---|
| 4,453,684 A * | 6/1984 | Hanks | B64C 1/24 | 105/430 |
| 4,615,275 A * | 10/1986 | Ishizuka | B61D 19/023 | 105/348 |
| 5,005,850 A * | 4/1991 | Baughman | B60R 3/005 | 182/127 |
| 5,039,119 A * | 8/1991 | Baughman | B60R 3/005 | 182/127 |
| 5,154,125 A * | 10/1992 | Renner | B60R 3/02 | 105/349 |
| 5,284,349 A * | 2/1994 | Bruns | B60R 3/02 | 182/91 |
| 5,335,880 A * | 8/1994 | Klug | B64C 1/1415 | 105/280 |
| 5,538,265 A * | 7/1996 | Chen | B60R 3/02 | 280/163 |
| 5,584,493 A * | 12/1996 | Demski | B60R 3/02 | 105/445 |
| 5,695,207 A * | 12/1997 | Mouterde | B60P 3/14 | 280/163 |
| 6,178,364 B1 * | 1/2001 | Delurey | B60R 3/02 | 105/443 |
| 6,179,312 B1 * | 1/2001 | Paschke | B60R 3/02 | 105/444 |
| 6,182,598 B1 * | 2/2001 | Bozzo | B63B 27/14 | 114/362 |
| 6,213,486 B1 * | 4/2001 | Kunz | B60R 3/02 | 280/163 |
| 6,264,222 B1 * | 7/2001 | Johnston | B60R 3/02 | 105/444 |
| 6,347,686 B1 * | 2/2002 | Hedley | B60R 3/02 | 182/127 |
| 6,460,915 B1 * | 10/2002 | Bedi | B60J 5/0498 | 296/151 |
| 6,986,402 B2 * | 1/2006 | Hedley | B60R 3/02 | 182/127 |
| 7,111,858 B2 * | 9/2006 | Manser | B60R 3/02 | 182/127 |
| 7,621,374 B2 * | 11/2009 | Richey | E04F 11/064 | 182/77 |
| 7,677,494 B2 * | 3/2010 | Yada | B64C 1/143 | 14/71.1 |
| 7,775,537 B2 * | 8/2010 | Donnellan | B60R 3/02 | 280/163 |
| 8,196,865 B2 * | 6/2012 | Martin | B64C 1/24 | 105/444 |
| 8,397,869 B2 * | 3/2013 | Tsutsumi | E02F 9/0833 | 182/127 |
| 8,561,549 B2 * | 10/2013 | Charbonneau | B60J 5/0497 | 105/348 |
| 8,696,005 B2 * | 4/2014 | Kim | B60R 19/48 | 280/163 |
| 8,931,792 B1 * | 1/2015 | Klassen | B60R 3/02 | 182/65.1 |
| 9,033,277 B2 * | 5/2015 | Berthoud | E05D 13/123 | 244/118.3 |
| 9,120,426 B1 * | 9/2015 | Huebner | B60R 3/02 | |
| 9,586,527 B1 * | 3/2017 | Salter | B60R 3/02 | |
| 9,702,114 B2 * | 7/2017 | Larson | E02F 9/18 | |
| 9,776,482 B2 * | 10/2017 | Eloff | B60J 5/0486 | |
| 9,816,318 B2 * | 11/2017 | Johnson | E06C 7/183 | |
| 2005/0285365 A1 * | 12/2005 | Manser | B60R 3/02 | 280/163 |
| 2006/0087141 A1 * | 4/2006 | Bruford | B60R 3/02 | 296/37.1 |
| 2007/0283512 A1 | 12/2007 | Yada et al. | | |
| 2009/0078827 A1 * | 3/2009 | Martin | B60R 3/02 | 244/129.6 |
| 2009/0145692 A1 * | 6/2009 | Flickinger | A01D 41/1261 | 182/127 |
| 2010/0025954 A1 * | 2/2010 | Gottlinger | B60R 3/007 | 280/166 |
| 2012/0205195 A1 | 8/2012 | Tsutsumi et al. | | |
| 2013/0092474 A1 * | 4/2013 | Magnussen | E06C 5/04 | 182/127 |
| 2013/0154229 A1 * | 6/2013 | Kim | B60R 3/02 | 280/163 |
| 2013/0187354 A1 * | 7/2013 | Venkataraman | B60R 3/005 | 280/166 |
| 2014/0048352 A1 | 2/2014 | Takenawa et al. | | |
| 2015/0076785 A1 * | 3/2015 | Kokot | E06C 1/005 | 280/166 |
| 2015/0224935 A1 * | 8/2015 | Huebner | B60R 3/02 | 280/166 |
| 2016/0137040 A1 * | 5/2016 | Eloff | B60J 5/0486 | 296/146.9 |
| 2017/0190293 A1 * | 7/2017 | Koga | B60R 3/005 | |
| 2017/0327046 A1 * | 11/2017 | Uemura | B60R 3/02 | |

FOREIGN PATENT DOCUMENTS

| | | |
|---|---|---|
| JP | 2007-276565 A | 10/2007 |
| JP | 2013-87416 A | 5/2013 |
| WO | 2012/035848 A1 | 3/2012 |

* cited by examiner

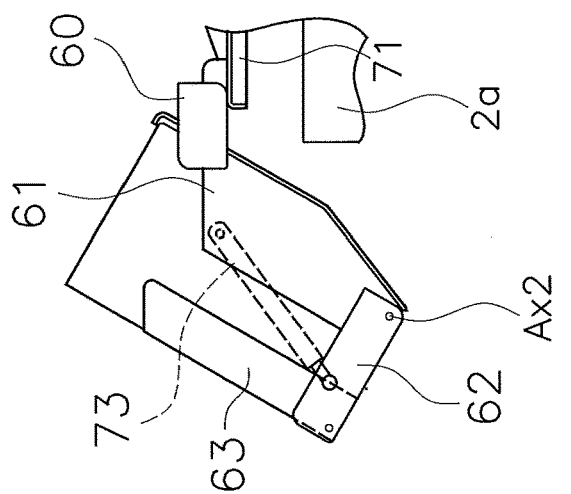
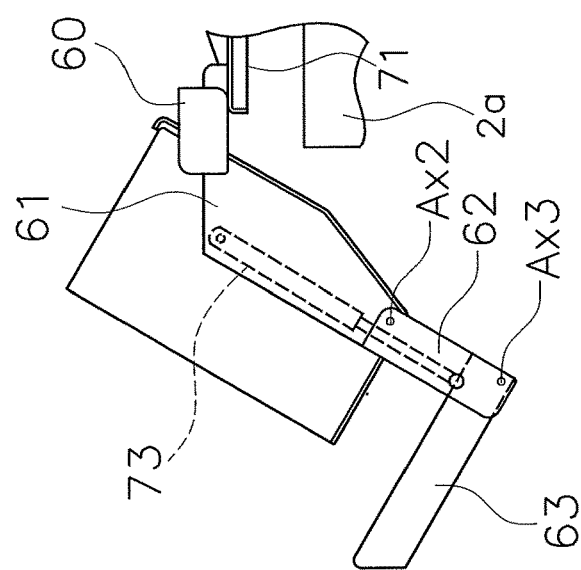
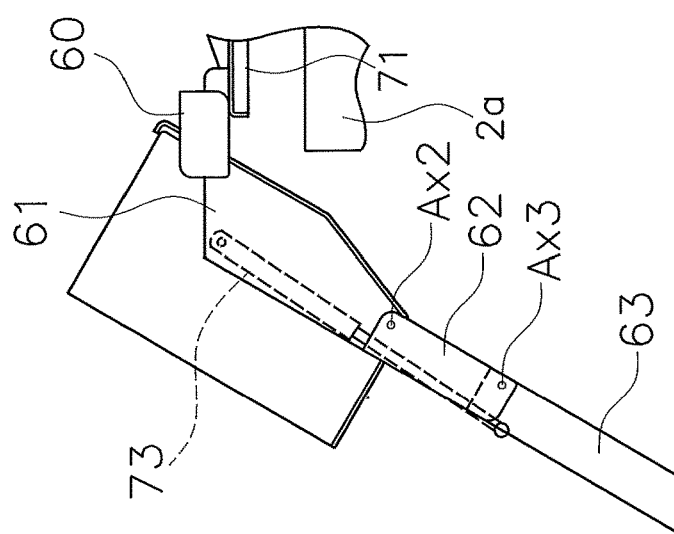

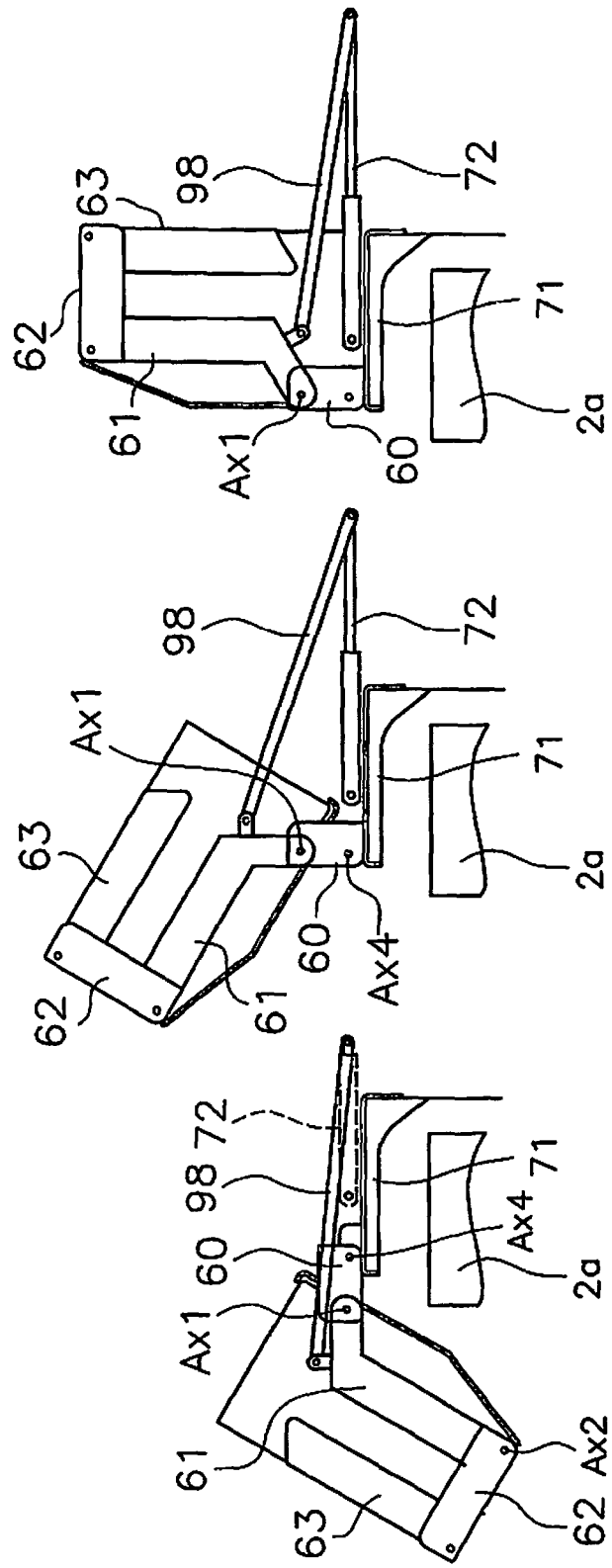

US 10,005,397 B2

WORK VEHICLE

CROSS-REFERENCE TO RELATED APPLICATIONS

This application is a U.S. National stage application of International Application No. PCT/JP2016/054468, filed on Feb. 16, 2016. This U.S. National stage application claims priority under 35 U.S.C. § 119(a) to Japanese Patent Application No. 2015-033295, filed in Japan on Feb. 23, 2015, the entire contents of which are hereby incorporated herein by reference.

BACKGROUND

Field of the Invention

The present invention relates to a work vehicle.

DESCRIPTION OF THE RELATED ART

An access device for a person to climb into and out of a vehicle is provided in a work vehicle. The access device is, for example, a ladder or steps. The access device is provided in a manner that allows for switching between a usable state and a non-usable state. For example, an access device is attached to the vehicle body in a rotatable manner in the work vehicle in Japanese Patent Laid-open No. 2013-87416. The access device extends from the vehicle body downward toward the ground surface in the usable state. The access device is switched from the usable state to the non-usable state by rotating the access device with respect to the vehicle body. In the non-usable state, the access device is fixed to a side part of the vehicle body while extended in the front-back direction of the vehicle.

SUMMARY

The work vehicle is often used in severe work environments. For example, the work vehicle may come into contact with trees when traveling through a forest. Furthermore, the work vehicle may come into contact with sand and dirt or rocks during excavating work. Because the access device is exposed to the outside in the stored state in the above-mentioned work vehicle, an obstacle, such as a tree, sand and dirt, or a rock, may collide with the access device and could interfere with the access device.

An object of the present invention is to provide a technique that allows for the protection of an access device.

A work vehicle according to a first aspect of the present invention includes a vehicle body and an access device. The access device is attached to the vehicle body. The access device has an access member and an exterior cover. The exterior cover is attached to the access member. The access device can be switched between a stored state in which the access member is stored in the vehicle body and a deployed state in which the access member is deployed. In the stored state, the exterior cover becomes a portion of the exterior surface of the vehicle body and the access member is stored inside the vehicle body. In the deployed state, the access member extends from the vehicle body toward the ground surface and the exterior cover is disposed on the back side of the access member.

The access device is stored inside the vehicle body in the stored state in the work vehicle according to the present aspect. As a result, interference of obstacles with the access device can be suppressed and the access device can be protected.

The work vehicle may further include a travel device disposed at the side of the vehicle body. In the stored state, the access device may be disposed above the travel device. In the deployed state, the access device may be disposed at the lateral side of the travel device. In this case, by using the access device, an operator is able to easily cross over the travel device and climb into and out of the vehicle body.

In the stored state, at least a portion of the exterior cover may be flush with a surface including the adjacent exterior surface of the vehicle body.

The access member may have a first access member and a second access member. The second access member may be attached in a rotatable manner to the first access member. The exterior cover may have a first exterior cover attached to the first access member, and a second exterior cover attached to the second access member. The second exterior cover may be separate from the first access member. In this case, the first access member and the second access member can be stored in a compact manner by rotating and folding the first access member and the second access member around a rotational axis. Further, a portion of the exterior surface of the work vehicle can be easily formed by the first exterior cover and the second exterior cover.

In the deployed state, the second access member may be disposed below the first access member. In the stored state, the first exterior cover may become a portion of the lateral side surface of the exterior surface of the vehicle body, and the second exterior cover may become a portion of the upper surface of the exterior surface of the vehicle body. In this case, a portion of the lateral side surface and a portion of the upper surface of the exterior surface of the vehicle body can be easily formed with the first exterior cover and the second exterior cover.

In the stored state, the first access member may be disposed so as to extend in the up-down direction, and the second access member may be disposed so as to extend in the horizontal direction. The second access member may be shorter than the first access member. In this case, the access device can be stored in the horizontal direction in a compact manner.

The access member may further have a third access member. In the stored state, the second access member may be bent with respect to the first access member, and the third access member may be bent with respect to the second access member. In this case, the first to third access members can be stored in a compact manner.

In the stored state, the third access member may be disposed facing the first access member. In this case, the first to third access members can be stored in a compact manner.

In the deployed state, the first access member, the second access member, and the third access member may be disposed in a line along a straight line. In this case, the first to third access members can be disposed in an elongated manner in the deployed state.

The vehicle body may have a fender part disposed above the travel device. In the stored state, the access device may be disposed on the fender part. The access device may further have a coupling member. The coupling member may couple the access member and the vehicle body. The coupling member may be attached in a rotatable manner to the vehicle body. In the deployed state, the coupling member may protrude lateral to the side edge of the fender part. In this case, the access member can be disposed at the lateral side away from the side edge of the fender part in the deployed state. As a result, the access member can be disposed away from the travel device in the deployed state and interference with the travel device can be avoided.

The vehicle body may have a maintenance area and a plurality of compartments disposed so as to surround the maintenance area. In the deployed state, a passageway that joins an upper part of the access device and the maintenance area may be provided in the vehicle body. In the stored state, the exterior cover may become a portion of the exterior surface of the compartment and may close the passageway. In this case, the operator is able to use the access device to climb up onto the vehicle body and easily access the maintenance area through the passageway while the access device is in the deployed state. Accordingly, maintenance performance of the work vehicle can be improved.

The access device may further have an access member actuator that drives the access member. The vehicle body may have an access device operating member. The access device operating member is operated whereby the access member actuator is driven and the access device may be switched between the stored state and the deployed state. In this case, an operator is able to easily switch the access device between the stored state and the deployed state.

The first access member may be provided with a plurality of steps, a first side frame that couples portions on one side part of the plurality of steps, and a second side frame that couples portions on the other side part of the plurality of steps. The second side frame may be disposed away from the first side frame in the width direction of the steps. The rotational axis of the first access member may extend in the width direction of the steps. In this case, the plurality of access members can be stored in a compact manner by rotating and folding the first access member and the second access member around the rotational axis.

The access device may further have a handrail. The handrail is attached to the access member. In the stored state, the handrail is stored inside the vehicle body with the access member. In this case, the operator is able to safely climb up and down the access members with the handrail.

According to the present invention, a technique that allows for the protection of an access device can be provided.

BRIEF DESCRIPTION OF DRAWINGS

FIGS. 10A-10C illustrate the operation of the second and third access members of the access device.
FIGS. 11A-11C illustrate the operation of the first access member and the coupling member of the access device.

DESCRIPTION OF EXEMPLARY EMBODIMENTS

Figure 1:
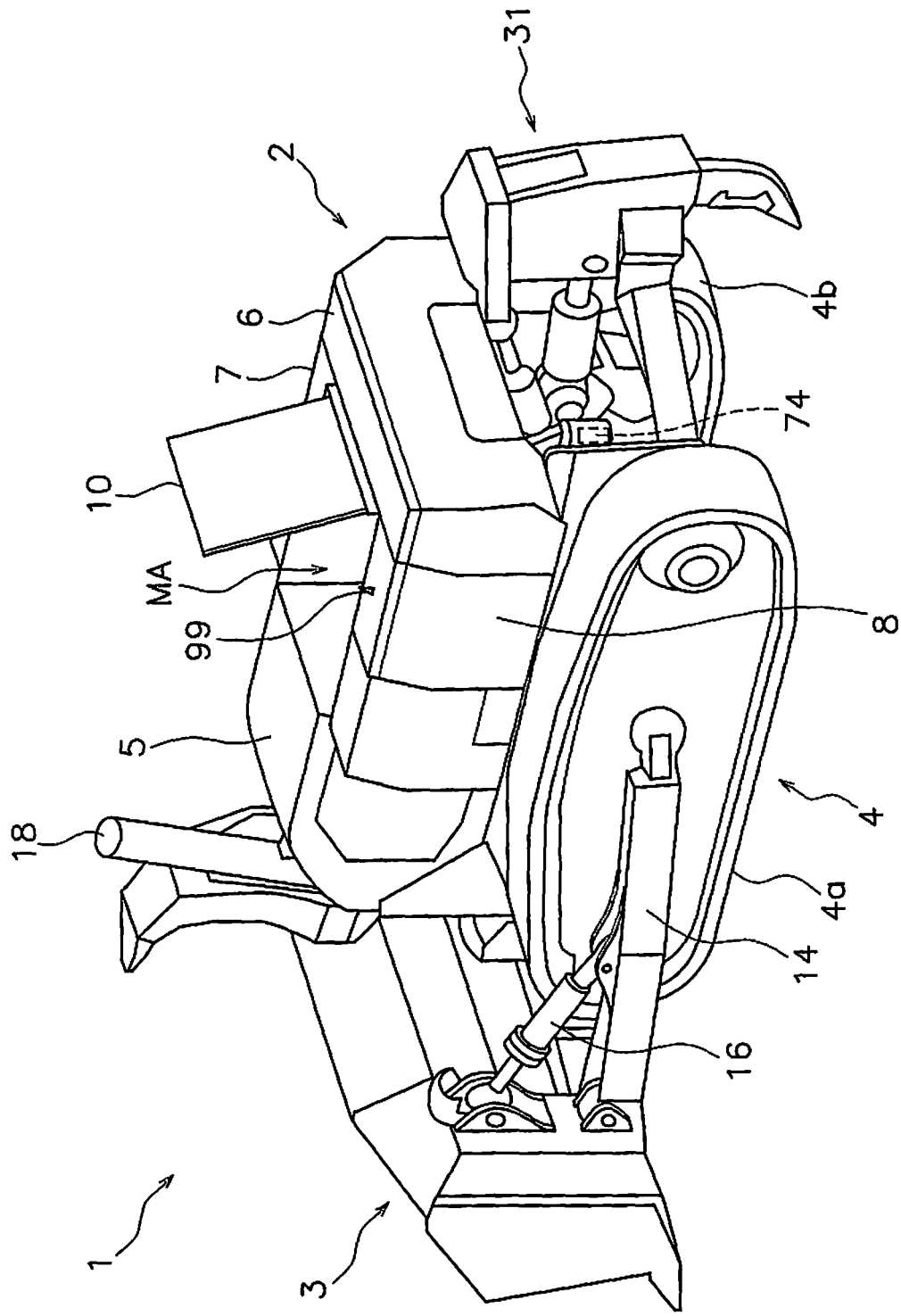
FIG. 1 is a perspective view of a work vehicle according to an exemplary embodiment.
Figure 2:
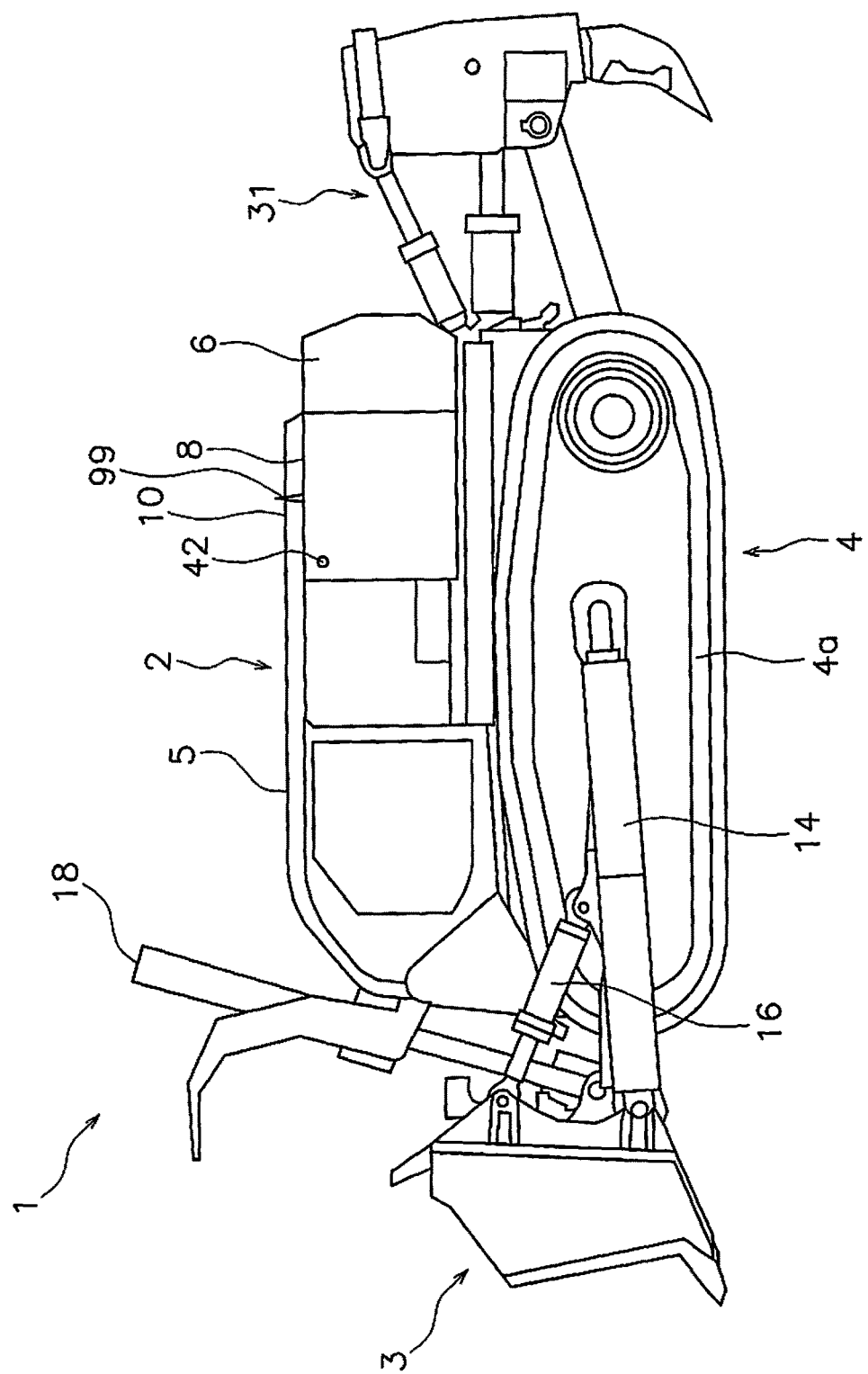
FIG. 2 is side view of the work vehicle.
Figure 3:
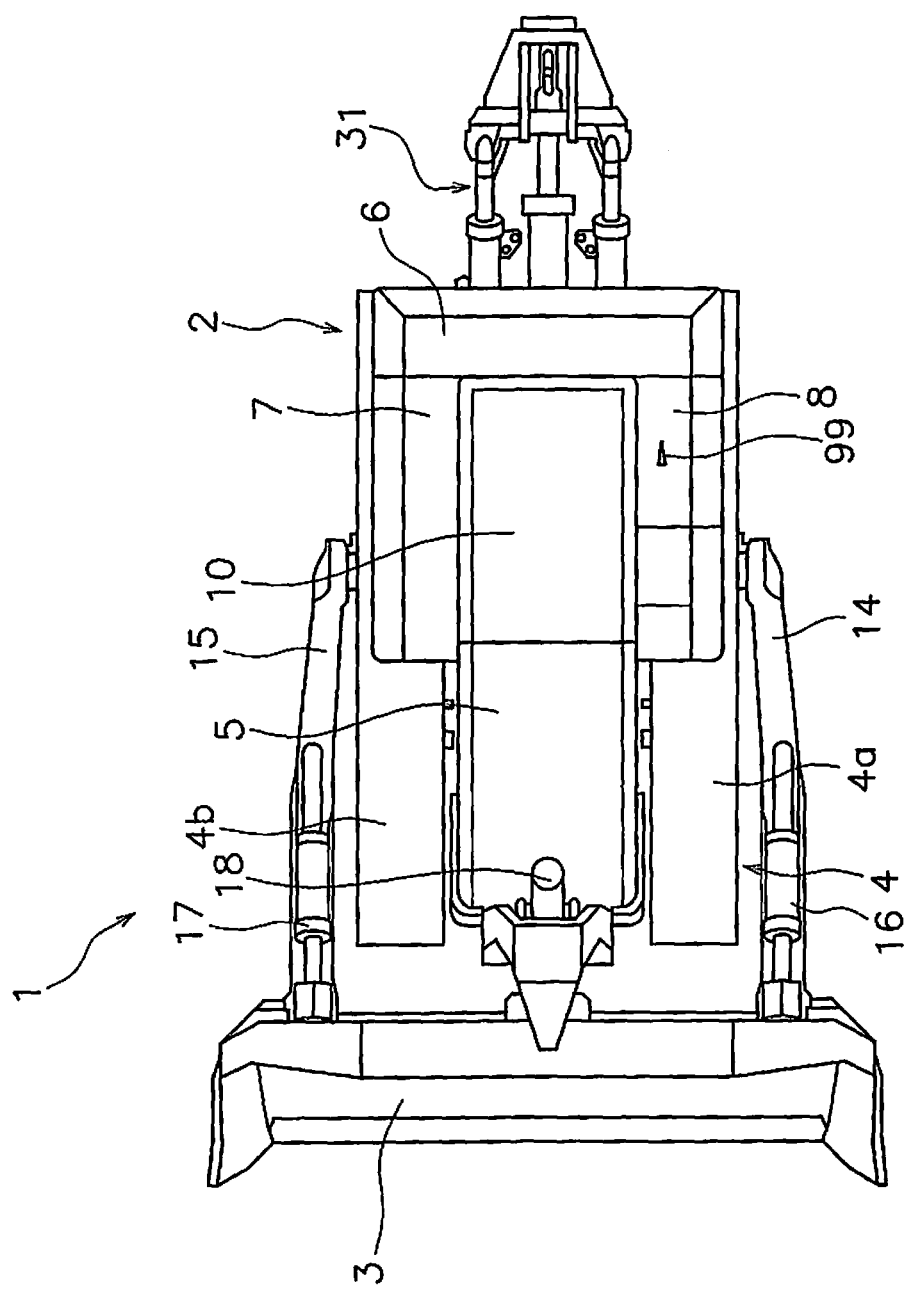
FIG. 3 is plan view of the work vehicle.

The following is a description of a work vehicle 1 according to an exemplary embodiment with reference to the drawings. FIG. 1 is a perspective view of a work vehicle 1 according to the present exemplary embodiment. FIG. 2 is a side view of the work vehicle 1. FIG. 3 is a plan view of the work vehicle 1. The work vehicle 1 is a bulldozer according to the present exemplary embodiment. The work vehicle 1 is a vehicle that is not provided with an operator's cab. As discussed below, the work vehicle 1 can be operated remotely. The work vehicle 1 includes a vehicle body 2 and a work implement 3.

The vehicle body 2 has a travel device 4 and an engine compartment 5. The travel device 4 is a device for causing the work vehicle 1 to travel. The travel device 4 has crawler belts 4a and 4b. The crawler belt 4a is mounted on the left side part of the vehicle body 2. The crawler belt 4b is mounted on the right side part of the vehicle body 2. The work vehicle 1 travels due to the crawler belts 4a and 4b being driven.

The front in the present exemplary embodiment signifies the direction in which the work implement 3 is disposed on the vehicle body 2, and the rear signifies the opposite direction. Left and right signify the left and right directions when facing toward the afore-mentioned front. The left-right direction may be paraphrased as the vehicle width direction.

The engine compartment 5 is disposed in the front part of the vehicle body 2. An engine 11 (see FIG. 4) is disposed inside the engine compartment 5.

The vehicle body 2 has a rear compartment 6, a right compartment 7, and a left compartment 8. The engine compartment 5, the rear compartment 6, the right compartment 7, and the left compartment 8 are disposed so as to surround a maintenance area MA as illustrated in FIG. 1. The engine compartment 5 is disposed in front of the maintenance area MA. The rear compartment 6 is disposed behind the maintenance area MA. The right compartment 7 is disposed to the right of the maintenance area MA. The left compartment 8 is disposed to the left of the maintenance area MA.

For example, the rear compartment 6 is a fuel tank. The rear compartment 6 may be configured to house the fuel tank. A cooling device such as a radiator is disposed in the right compartment 7. A hydraulic fluid tank is disposed in the left compartment 8. However, the items housed in the compartments 6 to 8 are not limited to the above items and may be changed.

A lid member 10 is disposed above the maintenance area MA. The lid member 10 is disposed so as to be able to open and close the maintenance area MA. The lid member 10 is depicted while open in FIG. 1 and the lid member 10 is depicted as closed in FIGS. 2 and 3. The rear part of the lid member 10 is rotatably attached to the rear compartment 6. The rotational axis of the lid member 10 extends in the vehicle width direction.

Doors (not illustrated) for opening and closing the engine compartment 5 and the right compartment 7 are provided facing the maintenance area MA on the engine compartment 5 and on the right compartment 7. A worker is able to access the inside of the engine compartment 5 and the inside of the right compartment 7 from the maintenance area MA by opening the door on the engine compartment 5 or on the right storing part 7.

The work implement 3 is disposed in front of the vehicle body 2. The work implement 3 is provided in front of the engine compartment 5. In the present exemplary embodiment, the work implement 3 is a blade. The work implement 3 is supported by a left arm 14 and a right arm 15. The left arm 14 is mounted on the left side part of the vehicle body 2. The right arm 15 is mounted on the right side part of the vehicle body 2.

A left tilt cylinder 16, a right tilt cylinder 17, and a lift cylinder 18 are attached to the work implement 3. The left tilt cylinder 16 is attached to the left side part of the vehicle body 2. The right tilt cylinder 17 is attached to the right side part of the vehicle body 2. The left tilt cylinder 16 and the right tilt cylinder 17 are driven by hydraulic fluid from a hydraulic pump 12 (see FIG. 4). The left tilt cylinder 16 and the right tilt cylinder 17 cause the work implement 3 to move to the left or right.

The lift cylinder 18 is attached to the center part of the vehicle body 2 in the vehicle width direction. Only one lift cylinder 18 is provided in the work vehicle 1. The lift cylinder 18 is disposed in front of the engine compartment 5. The lift cylinder 18 is disposed behind the work implement 3. The lift cylinder 18 is driven by hydraulic fluid from the hydraulic pump 12. The lift cylinder 18 causes the work implement 3 to move up and down.

The work vehicle 1 includes a ripper device 31. The ripper device 31 is disposed behind the vehicle body 2. The ripper device 31 is attached to a rear part of the vehicle body 2.

Figure 4:
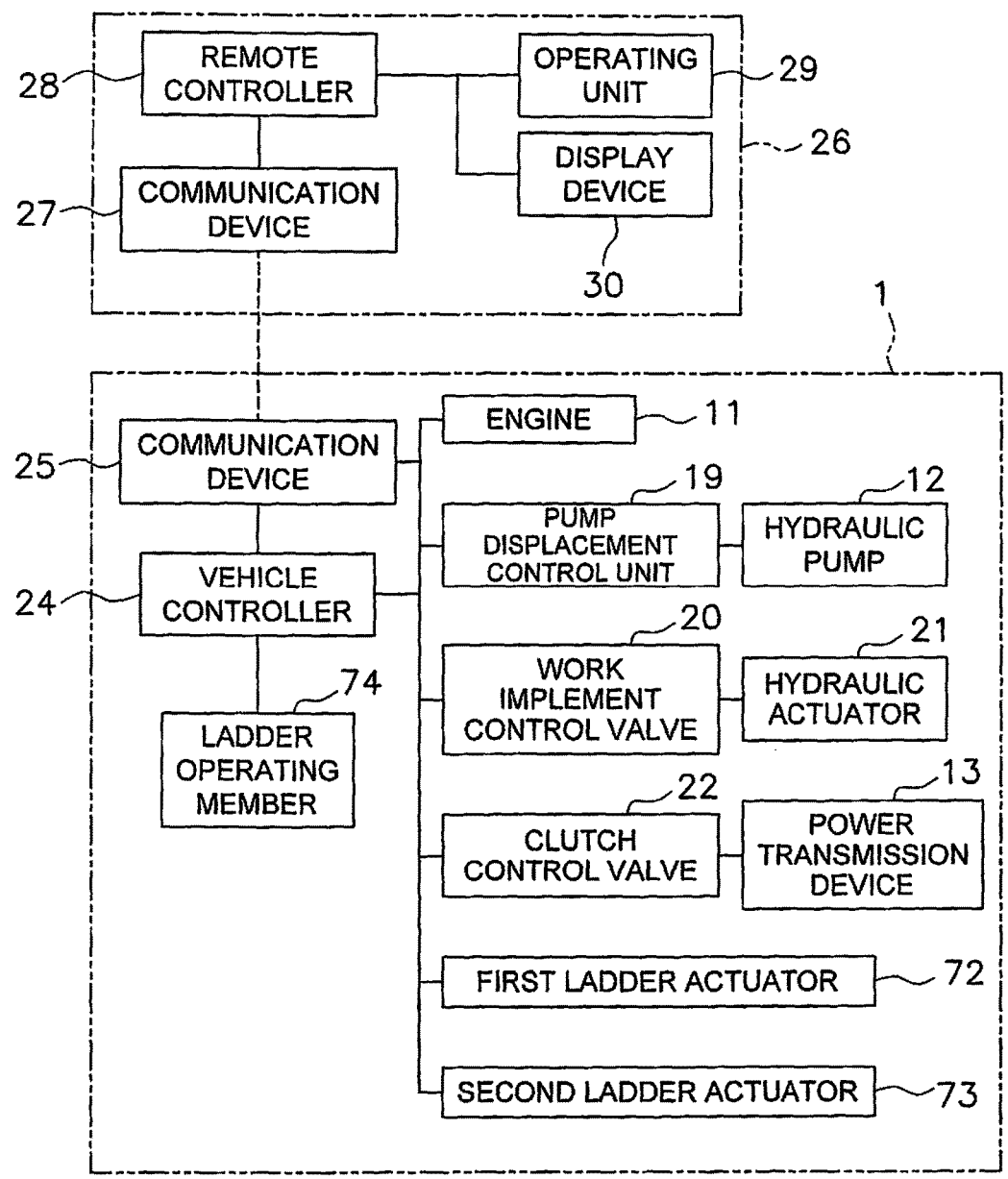
FIG. 4 is a block diagram illustrating a control system of the work vehicle.

FIG. 4 is a block diagram illustrating a control system of the work vehicle 1. As illustrated in FIG. 4, the work vehicle 1 has the hydraulic pump 12 and a pump displacement control unit 19. The hydraulic pump 12 is driven by the engine 11 to discharge hydraulic fluid. The hydraulic pump 12 is a variable capacitor pump and the pump displacement control unit 19 controls the discharge displacement of the hydraulic pump 12.

The work vehicle 1 has a work implement control valve 20 and a hydraulic actuator 21. The hydraulic actuator 21 is driven by hydraulic fluid discharged from the hydraulic pump 12. For example, the hydraulic actuator 21 includes the above-mentioned lift cylinder 18 and the left and right tilt cylinders 16 and 17 of the work implement 3. The work implement control valve 20 controls the supply and exhaust of the hydraulic fluid to and from the hydraulic actuator 21.

The work vehicle 1 has a power transmission device 13 and a clutch control valve 22. The power transmission device 13 includes, for example, a transmission and a torque converter. The clutch control valve 22 controls the switching of a speed change clutch, a forward/back clutch, and a steering clutch and the like included in the power transmission device 13.

As illustrated in FIG. 4, the work vehicle 1 includes a vehicle controller 24 and a communication device 25. The communication device 25 is connected to an antenna 99 (see FIG. 1) mounted on the vehicle body 2. The communication device 25 carries out wireless communication with a communication device 27 of a remote operating device 26. For example, the remote operating device 26 is disposed inside a management center away from the work site where the work vehicle 1 is used. Alternatively, the remote operating device 26 may be portable and may be disposed at the work site.

The vehicle controller 24 is configured with a computation device, such as a CPU, and a memory, such as a RAM or a ROM, or with a storage device, such as a hard disk. The vehicle controller 24 is programmed to control the work vehicle 1 on the basis of operation signals from the remote operating device 26.

The remote operating device 26 has a remote controller 28 and an operating unit 29. The remote controller 28 is configured with a computation device, such as a CPU, and a memory, such as a RAM or a ROM, or with a storage device, such as a hard disk.

The operating unit 29 is operated by an operator for driving the work vehicle 1. For example, the operating unit 29 includes a deceleration operating device for adjusting the output of the engine 11. The operating unit 29 includes a work implement operating device for operating the work implement 3. The operating unit 29 includes a ripper operating device for operating the ripper device 31. The operating unit 29 includes a steering operating device for changing the traveling direction of the work vehicle 1 to the right and left. The remote controller 28 transmits operation signals indicating the operating contents from the operating unit 29 to the communication device 25 of the work vehicle 1 via the communication device 27.

The remote operating device 26 has a display device 30. The display device 30 is configured with a display, such as a CRT, and LCD, or an OLED. However, the display device 30 is not limited to the afore-mentioned displays and may be another type of display.

The operator operates the operating unit 29 while viewing the display images. As a result, the operation signals are transmitted from the communication device 27 of the remote operating device 26, and the communication device 25 of the work vehicle 1 receives the operation signals from the remote operating device 26. The vehicle controller 24 controls the above-mentioned engine 11, the pump displacement controller 19, the work implement control valve 20, and the clutch control valve 22 and the like on the basis of the operation signals. As a result, the operator is able to operate the work vehicle 1 remotely.

Figure 5:
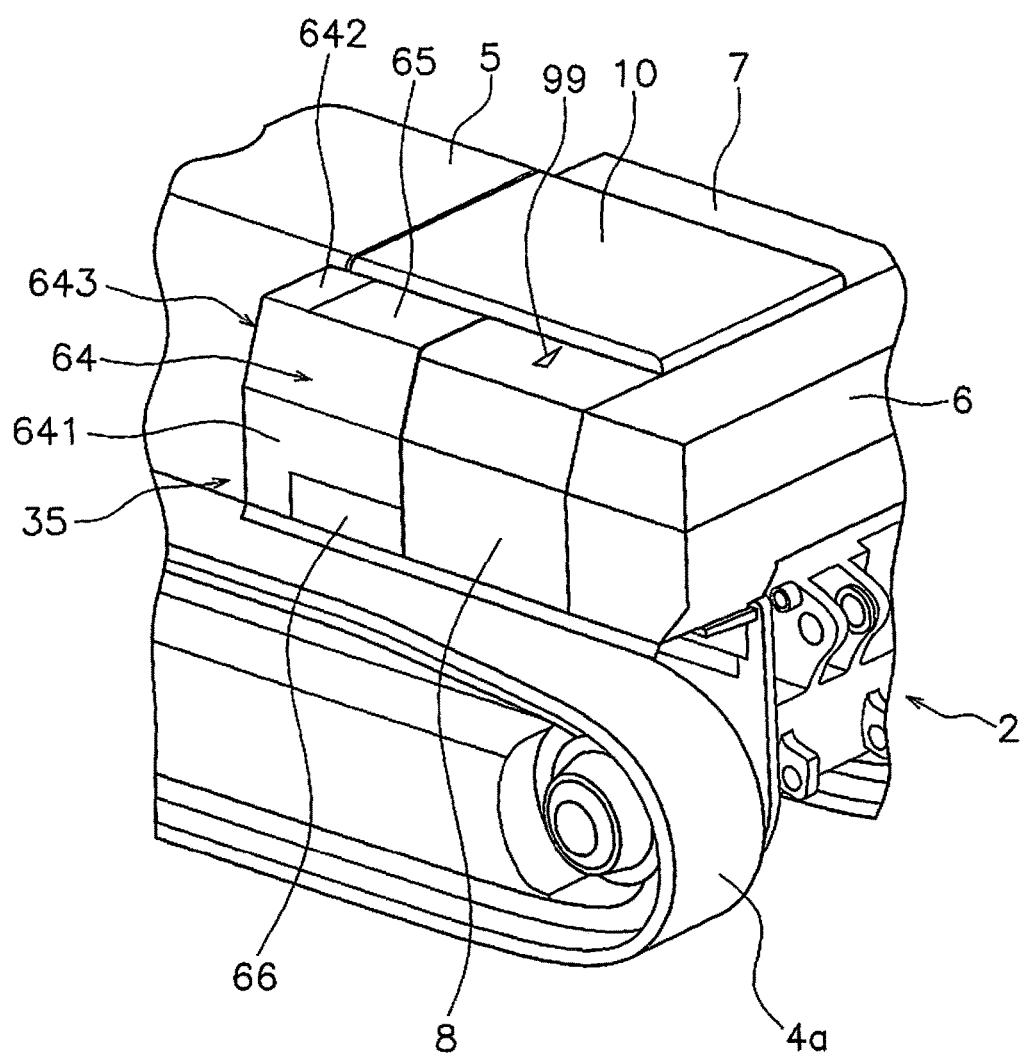
FIG. 5 is a perspective view of an access device in a stored state.
Figure 6:
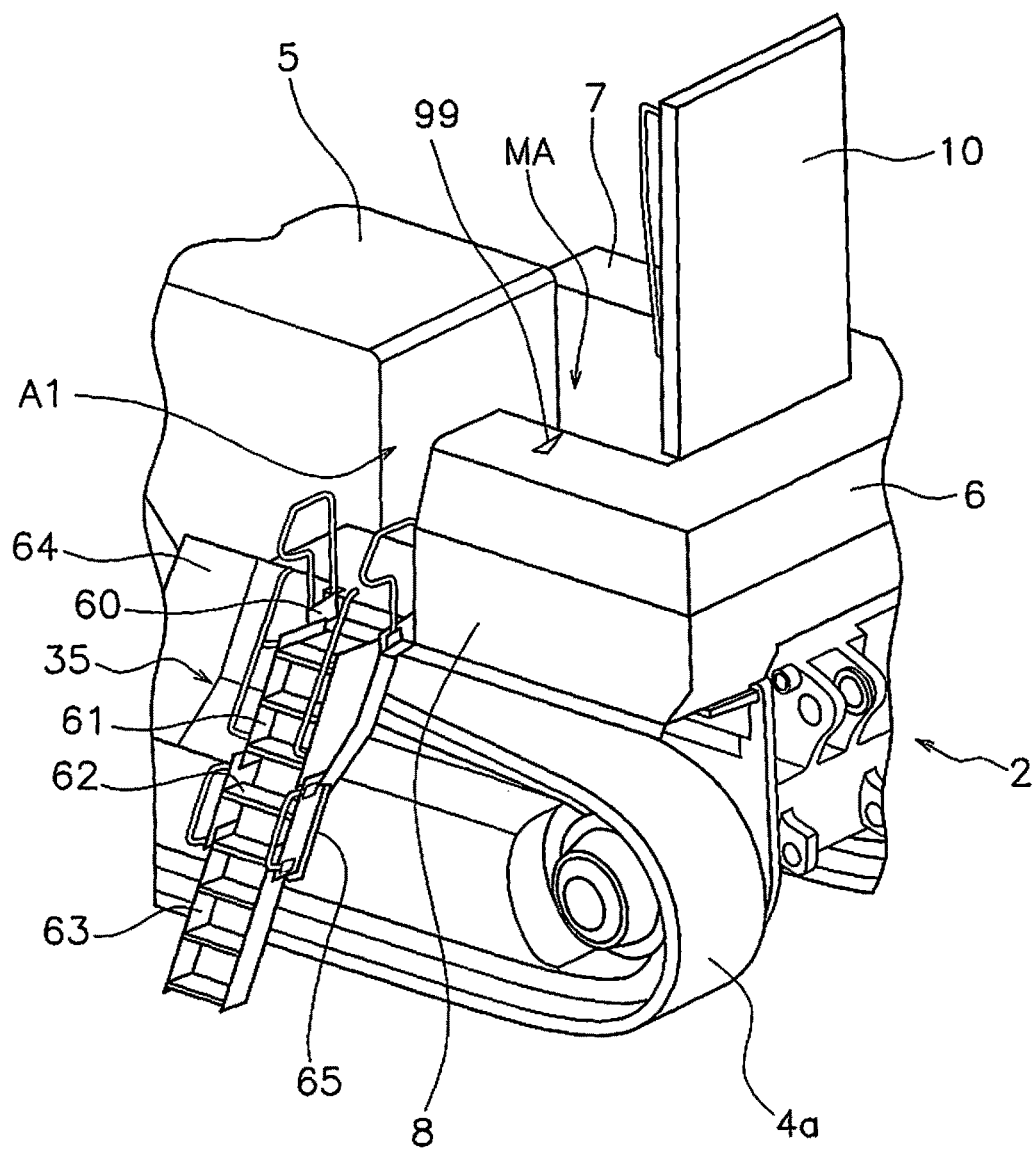
FIG. 6 is a perspective view of the access device in a deployed state.

As illustrated in FIGS. 5 and 6, the work vehicle 1 includes a ladder device 35 for an operator to climb onto and off of the vehicle body 2. The ladder device 35 is an example of an access device. The ladder device 35 will be explained in detail below. The ladder device 35 is attached to the vehicle body 2. The ladder device 35 can be switched between a stored state and a deployed state. FIG. 5 illustrates the ladder device 35 in the stored state. FIG. 6 illustrates the ladder device 35 in the deployed state.

Figure 7:
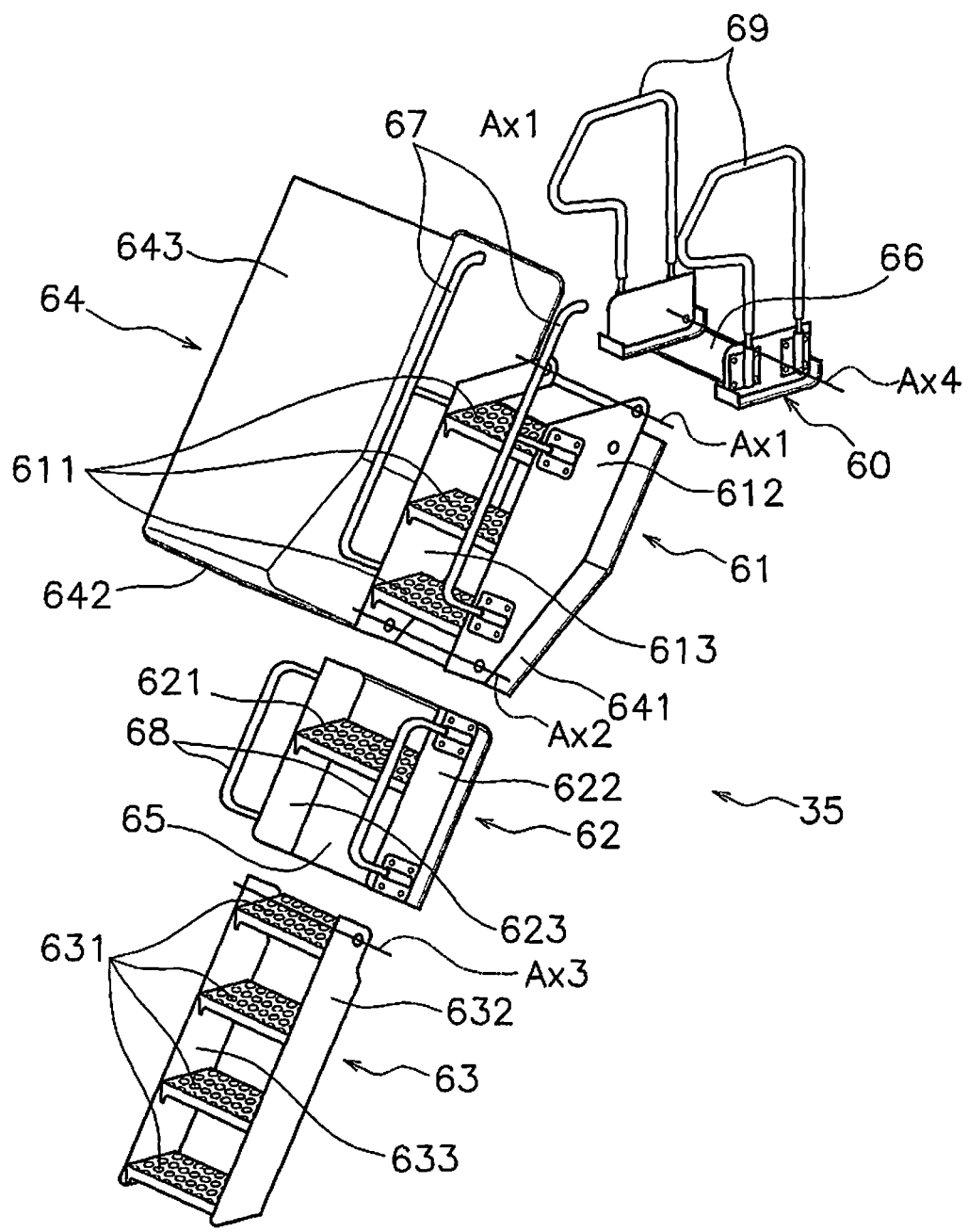
FIG. 7 is an exploded perspective view of the access device.

FIG. 7 is an exploded perspective view of the ladder device 35. As illustrated in FIG. 7, the ladder device 35 has a coupling member 60, a first ladder member 61 (first access member), a second ladder member 62 (second access member), a third ladder member 63 (third access member), a first exterior cover 64, a second exterior cover 65, and a third exterior cover 66. The coupling member 60 and the first ladder member 61 are attached in manner that allows rotation relative to each other. The first ladder member 61 and the second ladder member 62 are attached in manner that allows rotation relative to each other. The second ladder member 62 and the third ladder member 63 are attached in manner that allows rotation relative to each other.

The first ladder member 61 is disposed the furthest upward in the deployed state among the first to third ladder members 61 to 63. The first ladder member 61 has a plurality of steps 611, a first side frame 612, and a second side frame 613. The plurality of steps 611 are disposed in a line in the longitudinal direction of the first to third ladder members 61 to 63. The first side frame 612 couples one side part of the plurality of steps 611. The second side frame 613 is disposed away from the first side frame 612 in the width direction of the steps 611 and couples the other side part of the plurality of steps 611. The first ladder member 61 is rotatably attached to the coupling member 60. A rotational axis Ax1 of the first ladder member 61 with respect to the coupling member 60 extends in the width direction of the steps 611.

A pair of first handrails 67 are attached to the first ladder member 61. The first handrails 67 are attached respectively to the first side frame 612 and the second side frame 613. The first handrails 67 extend in the longitudinal direction of the first to third ladder members 61 to 63.

In the deployed state, the second ladder member 62 is disposed below the first ladder member 61. In the deployed state, the second ladder member 62 is disposed between the first ladder member 61 and the third ladder member 63. The second ladder member 62 has steps 621, a first side frame 622, and a second side frame 623 in the same way as the first ladder member 61. The first side frame 622 and the second side frame 623 are disposed away from each other in the width direction of the steps 621. The second ladder member 62 is shorter than the first ladder member 61 in the longitudinal direction of the first to third ladder members 61 to 63 in the deployed state. A pair of second handrails 68 are attached to the second ladder member 62. The second ladder member 62 is rotatably attached to the first ladder member 61. A rotational axis Ax2 of the second ladder member 62 with respect to the first ladder member 61 is parallel to the rotational axis Ax1 of the first ladder member 61 and extends in the width direction of the steps 621.

The third ladder member 63 is disposed the lowest in the deployed state among the first to third ladder members 61 to 63. The third ladder member 63 has steps 631, a first side frame 632, and a second side frame 633 in the same way as the first ladder member 61. The first side frame 632 and the second side frame 633 are disposed away from each other in the width direction of the steps 631. The third ladder member 63 is longer than the second ladder member 62 in the longitudinal direction of the first to third ladder members 61 to 63 in the deployed state. A rotational axis Ax3 of the third ladder member 63 with respect to the second ladder member 62 is parallel to the rotational axes Ax1 and Ax2 of the first and second ladder members 61, 62, and extends in the width direction of the steps 631.

The coupling member 60 couples the first ladder member 61 and the vehicle body 2. A pair of third handrails 69 are attached to the coupling member 60. The coupling member 60 is rotatably attached to the vehicle body 2. A rotational axis Ax4 of the coupling member 60 with respect to the vehicle body 2 is parallel to the rotational axes Ax1 to Ax3 of the first to third ladder members 61 to 63. The rotational axis Ax4 of the coupling member 60 and the rotational axes Ax1 to Ax3 of the first to third ladder members 61 to 63 are parallel to the front-back direction of the work vehicle.

The first exterior cover 64 is attached to the first ladder member 61. The first exterior cover 64 has a side surface part 641, an upper surface part 642, and a front surface part 643. The side surface part 641 is wider than the first ladder member 61. The side surface part 641 extends further to the front than the first ladder member 61. The second exterior cover 65 is attached to the second ladder member 62. The second exterior cover 65 is separate from the first ladder member 61.

Figure 8:
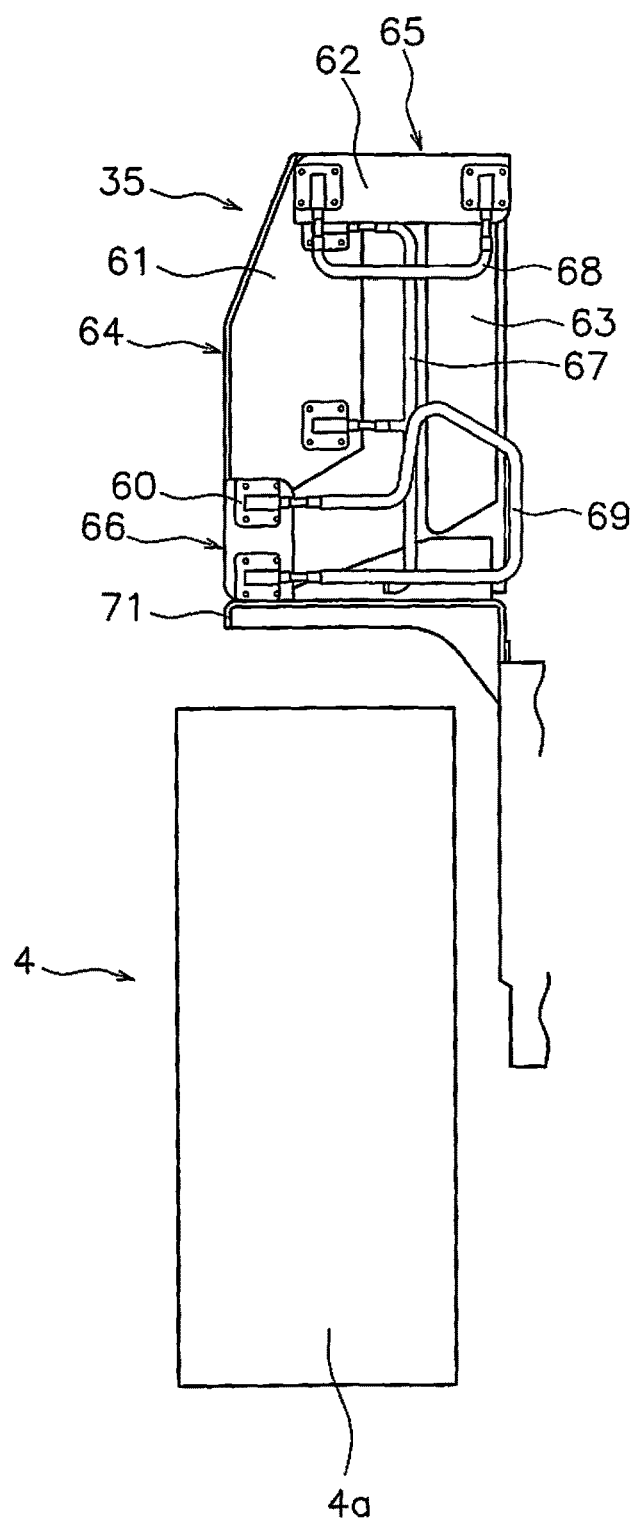
FIG. 8 is a cross-sectional view of the access device in the stored state.
Figure 9:
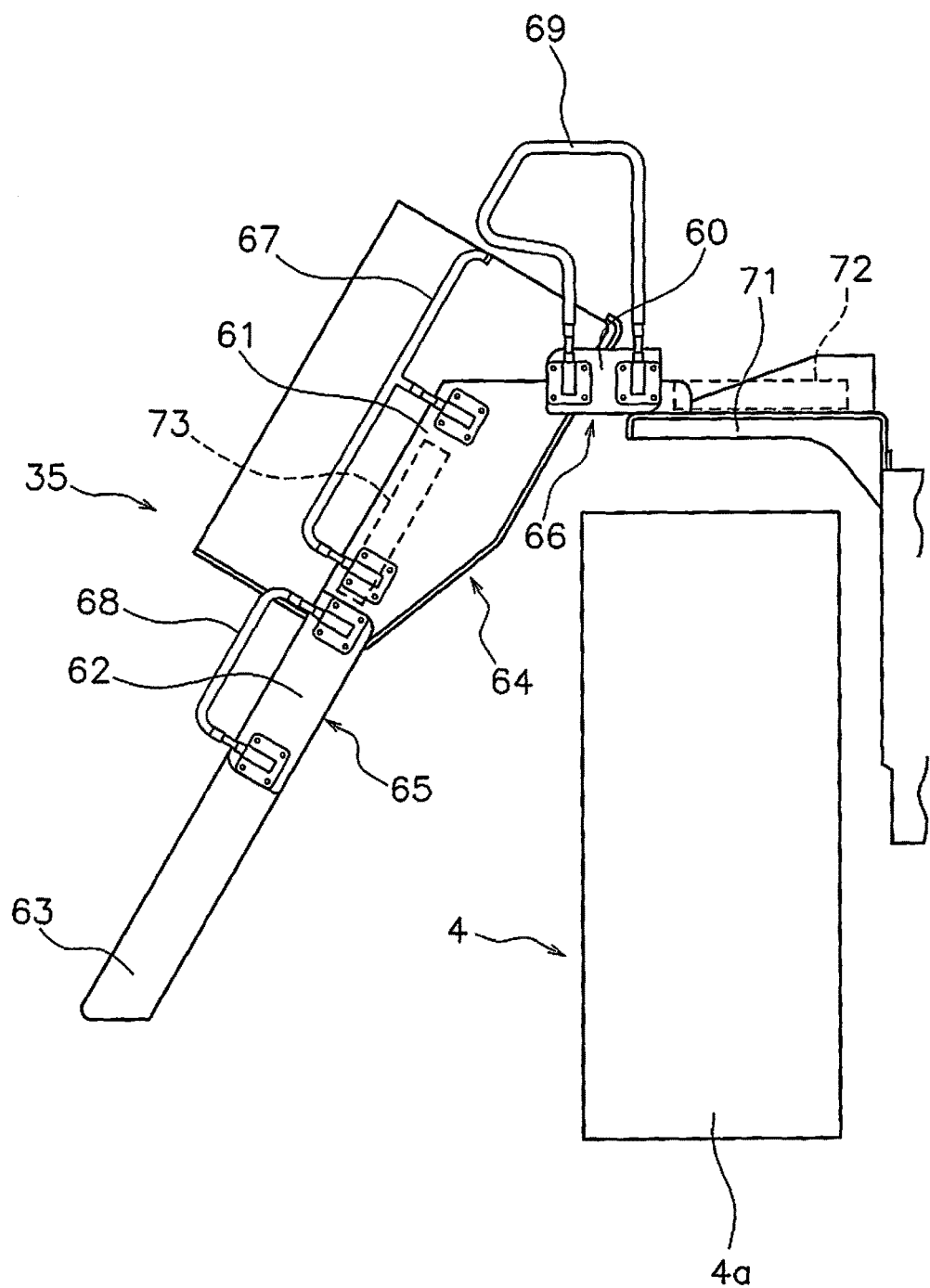
FIG. 9 is a cross-sectional view of the access device in the deployed state.

FIG. 8 is a cross-sectional view of the ladder device 35 in the stored state. FIG. 9 is a cross-sectional view of the ladder device 35 in the deployed state. As illustrated in FIG. 8, the ladder device 35 is disposed above the travel device 4 in the stored state. Specifically, the vehicle body 2 has a fender part 71 disposed above the crawler belt 4a. In the stored state, the ladder device 35 is disposed on the fender part 71. In the stored state, the ladder device 35 is disposed further to the inside than the side edge of the fender part 71. Therefore, the ladder device 35 does not protrude to the outside from the fender part 71 in the stored state.

The first to third ladder members 61 to 63 are folded and stored inside the exterior covers 64 to 66 in the stored state. As a result, the first to third ladder members 61 to 63 are not exposed to the outside and cannot be seen from the outside in the stored state. As illustrated in FIGS. 5 and 8, the first exterior cover 64 becomes a portion of the side surface of the exterior surface of the vehicle body 2, and the second exterior cover becomes a portion of the upper surface of the exterior surface of the vehicle body 2 in the stored state.

Specifically, the side surface part 641 of the first exterior cover 64 becomes a portion of the lateral side surface of the left compartment 8 in the stored state. The third exterior cover 66 becomes a portion of the lateral side surface of the left compartment 8 along with the side surface part 641 of the first exterior cover 64. The upper surface part 642 of the first exterior cover 64 and the second exterior cover 65 become a portion of the upper surface of the left compartment 8. The front surface part 643 of the first exterior cover 64 becomes the front surface of the left compartment 8. The outer surfaces, or at least a portion of the outer surfaces, of the first exterior cover 64, the second exterior cover 65, and the third exterior cover 66 are present on a plane that is the same or is substantially the same as the plane including the exterior surfaces of the vehicle body 2 adjacent in the front-back direction to each of the outer surfaces in the stored state.

The second ladder member 62 enters a state of being bent 90 degrees with respect to the first ladder member 61, and the third ladder member 63 enters a state of being bent 90 degrees with respect to the second ladder member 62 in the stored state. The coupling member 60 extends upward on the fender part 71 and the first ladder member 61 is disposed above the coupling member 60 in the stored state. The first ladder member 61 is disposed so as to extend in the up-down direction, the second ladder member 62 is disposed so as to extend in the horizontal direction, and the third ladder member 63 is disposed so as to extend in the up-down direction in the stored state. The third ladder member 63 faces the first ladder member 61 and the coupling member 60 in the stored state.

The first to third handrails 67 to 69 are stored inside the first and second exterior covers 64 and 65 along with the coupling member 60 and the first to third ladder members 61 to 63 in the stored state. The first handrails 67 are disposed between the first ladder member 61 and the third ladder member 63 in the stored state.

The clearance between the pair of the first handrails 67 is smaller than the clearance between the pair of second handrails 68. Furthermore, the clearance between the pair of the first handrails 67 is smaller than the clearance between the pair of third handrails 69. As a result, the pair of first handrails 67 are disposed between the pair of second handrails 68 in the stored state. The pair of first handrails 67 are disposed between the pair of third handrails 69 in the stored state.

The width of the third ladder member 63 is less than the clearance between the pair of second handrails 68. The width of the third ladder member 63 is less than the clearance between the pair of third handrails 69. The third ladder member 63 is disposed between the pair of second handrails 68 in the stored state. The third ladder member 63 is disposed between the pair of third handrails 69 in the stored state.

As illustrated in FIGS. 6 and 9, the ladder device 35 is disposed at the lateral side of the travel device 4 in the deployed state. The first to third ladder members 61 to 63 are deployed, and the first ladder member 61, the second ladder member 62, and the third ladder member 63 are disposed in a line on a straight line in the deployed state. The first to third ladder members 61 to 63 extend from the vehicle body 2 toward the ground surface at the lateral side of the vehicle body 2 in the deployed state.

The coupling member 60 extends to the lateral side from the fender part 71 and protrudes to the lateral side further than the side edge of the fender part 71 in the deployed state. The first exterior cover 64 is disposed on the back side of the first ladder member 61 and the second exterior cover 65 is disposed on the back side of the second ladder member 62 in the deployed state. The first handrails 67 are disposed on the front side of the first ladder member 61 and the second handrails 68 are disposed in the front side of the second ladder member 62 in the deployed state.

The front side of the ladder member signifies the side on which the operator climbs up and down in the deployed state and the back side signifies the opposite side.

As illustrated in FIG. 9, the ladder device 35 has a first ladder actuator 72 and a second ladder actuator 73. The first ladder actuator 72 drives the coupling member 60 and the first ladder member 61. The second ladder actuator 73 drives the second ladder member 62 and the third ladder member 63. The first and second ladder actuators 72 and 73 are, for example, hydraulic cylinders and are driven by hydraulic fluid discharged from the hydraulic pump 12. The first and second ladder actuators 72 and 73 are driven whereby the ladder device 35 is switched between the stored state and the deployed state. The first and second ladder actuators 72 and 73 are not limited to hydraulic cylinders and may be another actuator such as an electric motor.

As illustrated in FIG. 4, the vehicle body 2 has a ladder operating member 74. The vehicle controller 24 controls the first and second ladder actuators 72 and 73 in response to the operation of the ladder operating member 74. As a result, the ladder device 35 is switched between the deployed state and the stored state in response to the operation of the ladder operating member 74. The ladder operating member 74 is preferably disposed in a position on the vehicle body 2 that can be accessed from the ground. For example as illustrated in FIG. 1, the ladder operating member 74 may be disposed between the crawler belts 4a and 4b in the rear part of the vehicle body 2.

Next, the operation of the ladder device 35 will be discussed. First, the operation of the ladder device 35 when switching the ladder device 35 from the deployed state to the stored state will be discussed.

In the deployed state illustrated in FIG. 10A, the second ladder actuator 73 contracts. Consequently, the third ladder member 63 is pulled by the second ladder actuator 73 and the third ladder member 63 rotates around the rotational axis Ax3 with respect to the second ladder member 62. As illustrated in FIG. 10B, the rotation of the third ladder member 63 is restricted by a stopper mechanism (not illustrated) while the third ladder member 63 is bent at 90 degrees with respect to the second ladder member 62. The second ladder actuator 73 then contracts further. Consequently, when the second ladder actuator 73 further pulls the third ladder member 63, the second ladder member 62 rotates, along with the third ladder member 63, around the rotational axis Ax2 with respect to the first ladder member 61. As a result, the third ladder member 63 and the second ladder member 62 are folded with respect to the first ladder member 61 and enter the stored state as illustrated in FIG. 10C.

Next, the first ladder actuator 72 expands as illustrated in FIG. 11A. Consequently, the first ladder actuator 72 pulls the first ladder member 61 via a link member 98. Due to the first ladder member 61 being pulled by the first ladder actuator 72, the coupling member 60 rotates, along with the first ladder member 61, around the rotational axis Ax4 with respect to the vehicle body 2 as illustrated in FIG. 11B. At this time, the positions of the third ladder member 63 and the second ladder member 62 are fixed with respect to the first ladder actuator 72 by the second ladder actuator 73, and therefore rotate along with the first ladder member 61 and the coupling member 60. As illustrated in FIG. 11B, the coupling member 60 rotates as far as a position perpendicular to the fender part 71 and the rotation is restricted at this position by a stopper mechanism (not illustrated).

The first ladder actuator 72 then expands further. Consequently, the first ladder actuator 72 further pulls the first ladder member 61 whereby the first ladder member 61 rotates around the rotational axis Ax1 with respect to the coupling member 60. As a result, the first to third ladder members 61 to 63 rotate with respect to the vehicle body 2 and enter the stored state illustrated in FIG. 11C.

Next, the operation of the ladder device 35 when switching the ladder device 35 from the stored state to the deployed state will be discussed. In the stored state illustrated in FIG. 11C, the first ladder actuator 72 contracts. Consequently, the first ladder member 61 is pushed via the link member 98 whereby the first ladder member 61 rotates around the rotational axis Ax1 with respect to the coupling member 60. At this time, the positions of the third ladder member 63 and the second ladder member 62 are fixed with respect to the first ladder actuator 72 by the second ladder actuator 73, and therefore rotate along with the first ladder member 61.

The rotation of the coupling member 60 is restricted by the stopper mechanism while the coupling member 60 is in the state illustrated in FIG. 11B. The first ladder actuator 72 then contracts further. Consequently, the first ladder actuator 72 further pushes the first ladder member 61 via the link member 98 whereby the coupling member 60 rotates around the rotational axis Ax4 with respect to the vehicle body 2. When the coupling member 60 is horizontal as illustrated in FIG. 11A, the rotation of the coupling member 60 is restricted by the stopper mechanism.

Next, the second ladder actuator 73 expands as illustrated in FIG. 10C. Consequently, the second ladder actuator 73 pushes the third ladder member 63 whereby the second ladder member 62 rotates around the rotational axis Ax1 with respect to the first ladder member 61. The rotation of the second ladder member 62 is restricted at a position where the second ladder member 62 is in line with the first ladder member 61 on a straight line as illustrated in FIG. 10B. The second ladder actuator 73 then expands further. Consequently, when the second ladder actuator 73 further pushes the third ladder member 63, and the third ladder member 63 rotates around the rotational axis Ax3 with respect to the second ladder member 62. As illustrated in FIG. 10A, the rotation of the third ladder member 63 is restricted by the stopper mechanism at the position where the third ladder member 63 is in line with the first ladder member 61 and the second ladder member 62 on a straight line. As a result, the ladder device 35 enters the deployed state.

The direction of contraction of the ladder actuators 72 and 73 may be different from the direction explained above in accordance with the structure of the link member.

The first to third ladder members 61 to 63 are folded and stored inside the first and second exterior covers 64 and 65 in the stored state of the ladder device 35 in the work vehicle according to the present embodiment discussed above. As a result, the ladder device 35 can be protected and interference of the ladder device 35 with an obstruction can be suppressed. Moreover, the first to third ladder members 61 to 63 are folded and stored in a compact state whereby shaking of the ladder device 35 is reduced even if the work vehicle receives a large shock. As a result, the load on the attachment parts of the ladder device 35 can be reduced.

Although the exemplary embodiment of the present invention has been described so far, the present invention is not limited to the above exemplary embodiment and various modifications may be made within the scope of the invention.

The work vehicle is not limited to a bulldozer, and may be another type of work vehicle, such as a wheel loader and the like.

The work vehicle is not limited to a remotely operated vehicle and may be a manned work vehicle. That is, an operator's cab may be provided on the vehicle body 2 and the devices for remote operation may be omitted. In this case, the operator is able to easily climb up to and down from the operator's cab by using the access device. Alternatively, an operator's cab may be provided on the vehicle body 2 in the same way as a manned work vehicle and a device that is the same as the remote operating device 26 may be provided inside the operator's cab.

The structure of the access device is not limited to the structure of the above exemplary embodiment and may be changed. For example, the number of access members is not limited to three and may be three or more, or may be two. The number of the exterior covers is not limited to three and there may be three or more or less than three.

While the access device in the above exemplary embodiment is provided in substantially the center part in the front-back direction on the left side part of the vehicle body 2, the disposition of the access device is not limited in this way. The access device may be provided in another portion of the vehicle body 2, such as on a right side part or on a rear part.

The access device is not limited to the ladder device as in the above exemplary embodiment, and may be another device such as steps.

According to the present invention, a technique that allows for the protection of an access device can be provided.

The invention claimed is:

1. A work vehicle comprising:
a vehicle body,
a travel device disposed at a lateral side of the vehicle body, the travel device including a crawler belt; and
an access device attached to the vehicle body,
the vehicle body including a fender part disposed above the crawler belt,
the access device including
an access member including a first access member and a second access member, the second access member being rotatably attached to the first access member,
an exterior cover attached to the access member, the exterior cover including a first exterior cover and a second exterior cover, the first exterior cover being attached to the first access member, the second exterior cover being separate from the first access member and attached to the second access member, and
a handrail attached to the access member,
the access device being configured to be switched between a stored state in which the access member is stored in the vehicle body and a deployed state in which the access member is deployed,
in the stored state, the access device being folded and disposed on the fender part above the crawler belt, the exterior cover forming a portion of an exterior surface of the vehicle body, and the access member and the handrail being stored inside the vehicle body,
in the deployed state, the access member extending from the vehicle body toward a ground surface, the exterior cover being disposed on a back side of the access member, and the access device being disposed at a lateral side of the travel device and further outward than the crawler belt in a vehicle width direction.

2. The work vehicle according to claim 1, wherein
in the stored state, at least a portion of the exterior cover is flush with a surface including the adjacent exterior surface of the vehicle body.

3. The work vehicle according to claim 1, wherein
in the deployed state, the second access member is disposed below the first access member, and
in the stored state, the first exterior cover forms a portion of a lateral side surface of the exterior surface of the vehicle body, and the second exterior cover forms a portion of an upper surface of the exterior surface of the vehicle body.

4. The work vehicle according to claim 1, wherein
in the stored state, the first access member extends in an up-down direction and the second access member extends in a horizontal direction, and
the second access member is shorter than the first access member.

5. The work vehicle according to claim 1, wherein
the access member further includes a third access member,
in the stored state, the second access member is disposed at an angle with respect to the first access member, and the third access member is disposed at an angle with respect to the second access member.

6. The work vehicle according to claim 5, wherein
in the stored state, the third access member is disposed facing the first access member.

7. The work vehicle according to claim 5, wherein
in the deployed state, the first access member, the second access member, and the third access member are disposed in a line along a straight line.

8. The work vehicle according to claim 1, wherein
the access device further includes a coupling member that couples the access member and the vehicle body,
the coupling member is rotatably attached to the vehicle body, and
in the deployed state, the coupling member protrudes further to the lateral side than a side edge of the fender part.

9. The work vehicle according to claim 1, wherein the vehicle body includes
a maintenance area, and
a plurality of compartments disposed to surround the maintenance area,
in the deployed state, a passageway that joins an upper part of the access device and the maintenance area is provided in the vehicle body, and in the stored state, the exterior cover forms a portion of the exterior surface of the compartments and closes the passageway.

10. The work vehicle according to claim 1, wherein
the access device further includes an access member actuator that drives the access member,
the vehicle body includes an access device operating member, and
the access device operating member is operated whereby the access member actuator is driven and the access device is switched between the stored state and the deployed state.

11. The work vehicle according to claim 1, wherein
the first access member includes
 a plurality of steps,
 a first side frame that couples one side part of the plurality of steps, and
 a second side frame disposed away from the first side frame in a width direction of the steps, the second side frame coupling the other side part of the plurality of steps, and
a rotational axis of the first access member extends in the width direction of the steps.

12. The work vehicle according to claim 11, wherein
the handrail of the access device includes a pair of first handrails attached to the first side frame and the second side frame respectively.

13. The work vehicle according to claim 1, wherein
the handrail of the access device includes a pair of first handrails attached to the first access member and a pair of second handrails attached to the second access member.

14. The work vehicle according to claim 5, wherein
the handrail of the access device includes a pair of first handrails attached to the first access member, a pair of second handrails attached to the second access member, and a pair of third handrails attached to the third access member.

15. The work vehicle according to claim 3, wherein
in the stored state, the portion of the lateral side surface of the exterior surface of the vehicle body formed by the first exterior cover faces outward in the vehicle width direction, and the portion of the upper surface of the exterior surface of the vehicle body formed by the second exterior cover faces upward in a vehicle vertical direction.

* * * * *